Dec. 13, 1960    J. L. WILLIAMS ET AL    2,964,291
SELF-ADJUSTING WEDGE GATE VALVE
Filed Dec. 17, 1957

INVENTORS.
JOHN L. WILLIAMS
STANLEY L. KUM
BY
BUCKHORN, CHEATHAM & BLORE
ATTORNEYS

United States Patent Office 2,964,291
Patented Dec. 13, 1960

2,964,291

SELF-ADJUSTING WEDGE GATE VALVE

John L. Williams, 17467 NE. West View Road, Oswego, Oreg., and Stanley Leo Kum, 325 SE. 30th Ave., Portland, Oreg.

Filed Dec. 17, 1957, Ser. No. 703,310

1 Claim. (Cl. 251—327)

This invention relates to wedge gate valves, and the primary object of the invention is to provide a double-disk type wedge gate valve in which the disks are mounted in a simple and effective manner enabling them to adjust properly to seat against the valve seats of the valve.

A further object of the invention is to provide such a wedge gate valve in which the disks are permitted turning or rotary movement relative to the carrier for the disks.

Various other objects of the invention will be apparent from the following description taken in connection with the accompanying drawings wherein.

Referring to the accompanying drawings, the valve body includes a chest portion 11 and a bonnet 13, said portions being suitably secured together by flanges 15 and 17 and bolts 19.

Figure 1:
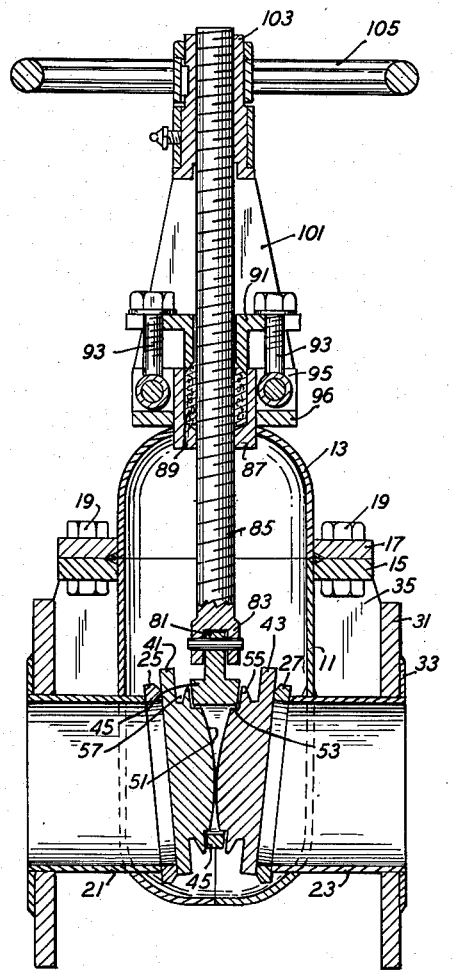
Fig. 1 is a vertical section through a wedge gate valve embodying the concepts of the present invention.

Projecting into the chest 11 and secured thereto are a pair of tubular fluid passage members 21 and 23 having valve seats 25 and 27 secured to the inner ends thereof, said valve seats being angularly related to one another and forming an upwardly opening acute angle as the parts are shown in Fig. 1. Secured to the outer ends of the members 21 and 23 are bolting flanges 31 and raised faces 33, said flanges being reinforced by webs 35 secured to the flanges, tubular members and the valve chest.

Adapted to seat against the seats 25 and 27 are a pair of disks 41 and 43 supported by an annular carrier 45. Each disk has a rearwardly projecting convex portion 51 rockably engaging the similar portion of the other disk. These portions project into the carrier 45 and provide annular shoulders 53 disposed adjacent to but spaced from the interior surface of the carrier 45.

It is apparent from Fig. 1 that the carrier 45 is tapered from top to bottom to dispose the disks 41 and 43 in angular relation to one another.

Figure 4:
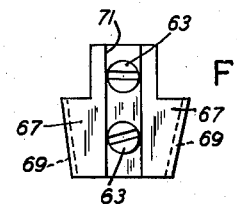
Fig. 4 is an elevational view of a retainer taken on an enlarged scale.

Each disk is also formed with an annular radially projecting rib 55 providing a groove 57 completely therearound. The convex portions 51 separate the inner surfaces of the ribs 55 from the end faces of the carrier 45 enabling the disks to rock without interference by the carrier. Holding the disks in place on the carrier are a pair of retainers 61, each being detachably secured by screws 63 to a pad 65 formed on the side of the carrier. Each retainer is provided with laterally projecting wings 67, as shown in Fig. 4, and the wings provide inwardly projecting flanges 69 fitting in the grooves 57 of the disks 41 and 43. It is pointed out that the fit of the flanges 69 within the grooves 57 is a loose fit and thus there is lost motion between the flanges 69 and the ribs 55.

To disassemble the disk unit, one of the retainers 61 may be removed permitting the disk to be tilted outwardly and away from the flanges of the other retainer. In fact, if desired, one of the retainers may be formed integrally with the carrier 45.

Figure 2:
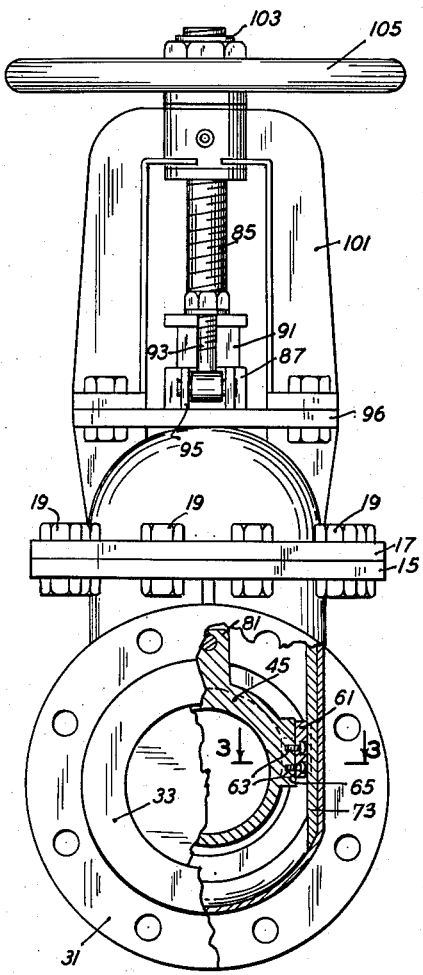
Fig. 2 is an end view of the valve, parts being shown in section for convenience in illustration.
Figure 3:
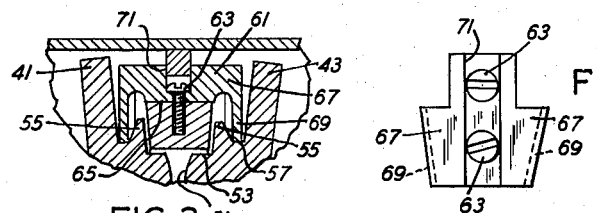
Fig. 3 is an enlarged fragmentary section taken along line 3—3 of Fig. 2.

Each retainer is provided with a groove or guideway 71 fitting on the guide strip 73 secured at each side of the chest 11 to the interior surface thereof as clearly shown in Fig. 2.

The carrier 45 is provided with an upstanding boss 81 connected by a clevis connection 83 to a stem 85. The stem projects upwardly through a packing box 87 secured to the upper end of the bonnet 13. The box contains packing 89 pressed in place by a gland 91, the latter being held down by swing bolts 93 pivoted on mounting pieces 95 secured to a flange 96 fixed to the box 87.

A yoke 101 has the lower portions thereof bolted to the flange 96. The upper end of the yoke carries a nut 103 threadedly receiving the upper end of the stem 85. The nut is secured to a handwheel 105 so that upon rotation of the handwheel the stem 85 is drawn upwardly to separate the disks 41 and 43 from the seats 25 and 27. The thrust connection between the shoulders 53 on the disks and the interior of the carrier 45 enables the carrier to move the disks upwardly and downwardly.

With a valve of the present invention, the disks 41 and 43 may be made of identical construction and may be readily cast into the form shown. The carrier 45 may also be a cast unit and the two retainers 61 may be cast and bolted or screwed to the carrier. With these simple parts, the disks are permitted adjusting movement relative to the valve seats and the carrier and also are permitted to turn or rotate relative to the carrier to distribute wear and to enable the disks to seat properly on the valve seats 25 and 27. It is pointed out that the retainers are not required to transmit a lifting force from the carrier to the disks.

Having described the invention in what is considered to be the preferred embodiment thereof, it is desired that it be understood that the invention is not to be limited other than by the provisions of the following claim.

We claim:

A wedge gate valve having a body and a movable valve assembly therein, said assembly including a pair of disks for seating against a pair of angularly related valve seats, a carrier for said disks, said carrier being in the form of a ring, the opening in the ring extending in a direction normal to the direction of movement of the valve assembly, each disk having an inwardly projecting boss loosely projecting into said opening, the opposed inner faces of said bosses being convex and engaging one another, the side walls of said bosses resting on the wall defining said opening to support said disks, each disk being formed with a shoulder at the base of its boss, said shoulder being disposed next to the associated axially facing margin of said carrier ring that surrounds said opening in said carrier ring, said bosses having sufficient dimension in a direction normal to the plane of said disks that contact between said bosses disposes said shoulders in spaced relation to the mentioned margins thus enabling said disks to adjust to positions to correctly seat against the seats of the valve, each disk having an annular rib formed thereon, the mentioned shoulder of each disk forming the inner side wall of said rib, each rib also having an outer side wall disposed generally in axial alignment with said shoulder, a retainer at each side of said carrier detachably secured to said carrier, each retainer having a retaining portion for each disk, each retaining portion projecting toward the associated disk in loose engagement with the outer side wall of the rib of the associated disk to prevent axial separation of said disks and carrier, said valve body having a vertical guide element at each side of the movable valve assembly, each retainer having a guide slot fitting on the associated guide element to prevent the movable valve assembly from turning about a vertical axis.

References Cited in the file of this patent

UNITED STATES PATENTS

| | | |
|---|---|---|
| 786,043 | Luckett | Mar. 28, 1905 |

FOREIGN PATENTS

| | | |
|---|---|---|
| 274,393 | Great Britain | of 1927 |
| 866,285 | Germany | of 1953 |